Sept. 12, 1961 C. SPARKMAN 2,999,480
LIVESTOCK CHUTE GATE
Filed July 17, 1959 2 Sheets-Sheet 1

COLONEL SPARKMAN
INVENTOR.

BY Loyal J. Miller

Sept. 12, 1961 C. SPARKMAN 2,999,480
LIVESTOCK CHUTE GATE
Filed July 17, 1959 2 Sheets-Sheet 2
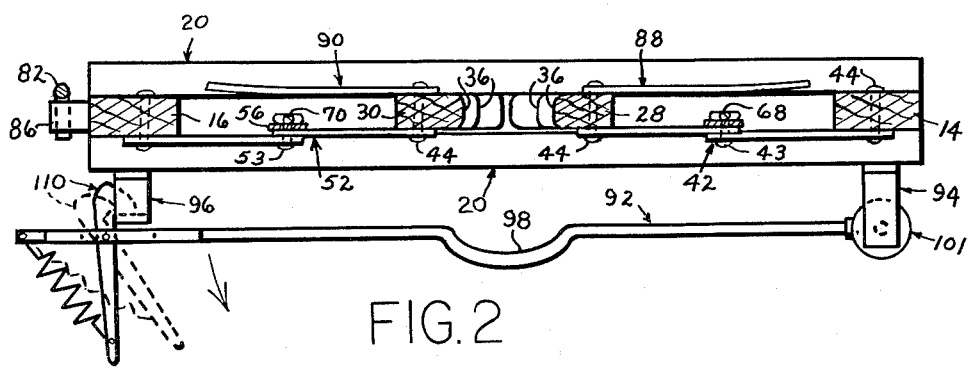
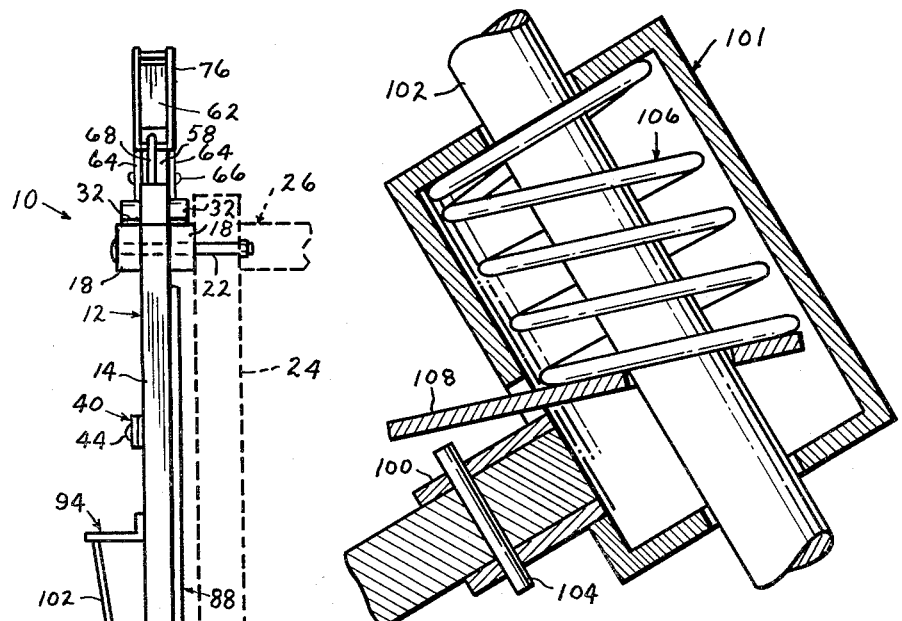
COLONEL SPARKMAN
INVENTOR.
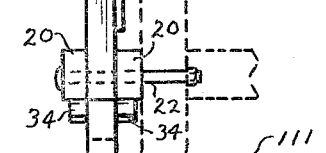
ATTORNEY

2,999,480
LIVESTOCK CHUTE GATE
Colonel Sparkman, Box 377, Elk City, Okla.
Filed July 17, 1959, Ser. No. 827,741
4 Claims. (Cl. 119—98)

The present invention relates to gates and more particularly to a livestock chute gate.

The prior art reveals a number of gates or means for engaging and holding the neck portion of animals in a livestock restraining chute, but none of these devices are adaptable to be removably connected with a livestock chute and operate quickly and independently thereof.

It is, therefore, the principal object of the instant invention to provide a stanchion equipped livestock chute gate that will engage the neck portion of an animal rearwardly of its head, and hold such animal for dehorning, branding or treatment.

Another important object is to provide a chute gate of this class which may be readily opened to permit the livestock to pass therethrough.

Another object is to provide a device of this class which features a system of levers, connected with vertical stanchions, which will move the stanchions and hold the same in open or closed position.

Another object is to provide a gate of this class by which a single operator may put cattle through a chute, and operate the gate for holding the animal, while standing close to the gate or at some distance from it.

Still another object is to provide a device of this class which may be used for trapping wild animals, such as buffalo, wild cattle, or deer, without an attendant being present.

Yet another object is to provide a chute gate which may be removably connected to an animal restraining chute or which may be used as a trailer or truck gate when transporting animals.

An additional object is to provide a chute gate which automatically adjusts the stanchions to various sizes and ages of livestock without any adjustment of the component parts of the gate.

Still another object is to provide a chute gate which is easily reversed for operation as a right or left hand chute gate.

An additional object is to provide a chute gate which is relatively simple in construction and which has a comparatively long useful life.

The present invention accomplishes these and other objects by providing a rectangular frame including a pair of vertical side members, joined in spaced-apart relation by a pair of top and bottom members, which may be removably connected to the open end of a livestock chute. A pair of stanchions are vertically supported between the top and bottom pairs of members by rollers. A lever is pivotally connected, intermediate its ends, by a support medially carried by the pair of top members for vertical swinging movement. Pivotally connected links connects the stanchions to the side members and the lever for moving the stanchions toward and away from each other in parallel relation when the lever is pivoted.

Other objects will be apparent from the following description when taken in conjunction with the accompanying two sheets of drawings, wherein:

FIGURE 2 is a horizontal cross-sectional view taken substantially along line 2—2 of FIG. 1;

FIGURE 3 is a right side elevational view of the device as seen in FIG. 1 and illustrating, by dotted lines its connection with a livestock chute; and, FIGURE 4 is a fragmentary vertical cross-sectional view of the nose bar adjustment means.

Like characters of reference designate like parts in those figures of the drawings in which they occur.

In the drawings:

Figure 1:
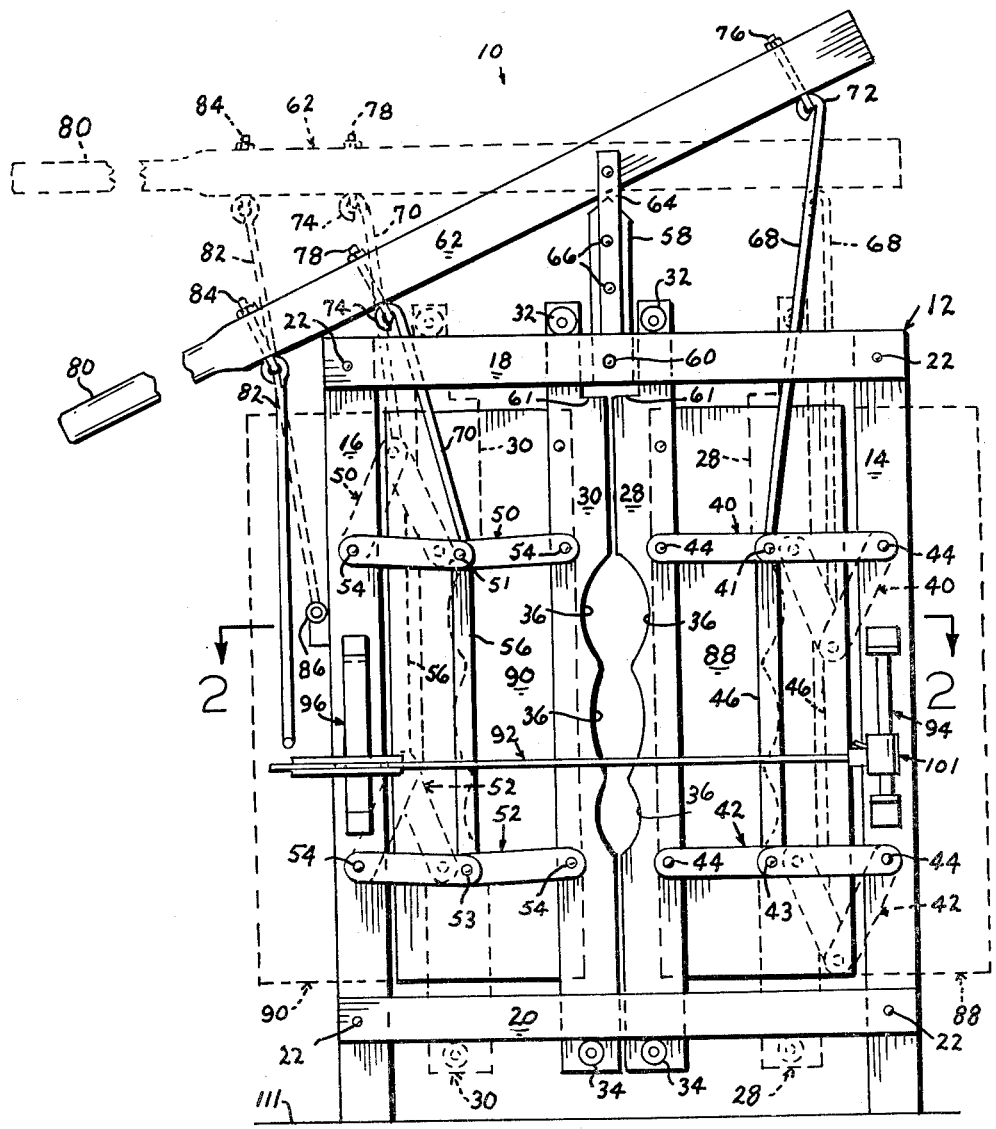
FIGURE 1 is a front elevational view of the device in closed position and illustrating, by dotted lines, its opened position.

The reference numeral 10 indicates the device, as a whole, which is rectangular in general configuration. The device 10 includes a frame 12, formed of any suitable material, preferably wood, having a pair of vertical side members 14 and 16 joined together in spaced-apart relation by a pair of upper or top members 18 connected to opposing sides of the upper end portion of the members 14 and 16. A pair of bottom members 20 extend horizontally between and are similarly connected at their opposing ends with the respective side members 14 and 16 adjacent their lower ends. Bolts 22 connect the respective top and bottom members to the side members and are adapted to be extended rearwardly of the frame through vertical posts 24 at the end of an animal chute 26. A pair of stanchions 28 and 30, preferably formed of wood, are vertically positioned between the upper and lower pairs of top and bottom members 18 and 20 and project beyond the respective upper and lower surfaces of these members. Rollers 32 and 34 are journaled on horizontal axis on opposing sides of the end portions of each of the stanchions which project respectively above and below the top and bottom members, thus the respective rollers 32, in contact with the top members 18, support the stanchions 28 and 30. Each of the inward or meeting edges of the stanchions are provided with rounded corners, as shown in FIG. 2 to prevent "skinning" the neck of an animal and each of these edges of the stanchions are provided with a series of graduated arcuate recesses 36 formed in vertical spaced relation intermediate their ends for the purposes more fully disclosed hereinbelow.

Two pairs of links 40 and 42, each comprising two strap metal links pivotally connected flatly together at one end, by pins 41 and 43, respectively, extend between and are each flatly connected at their respective opposing ends in pivoting relation by bolts 44 to the side member 14 and stanchion 28, intermediate their ends, in vertical spaced relation on the forward side of the frame between the top and bottom members 18 and 20. A vertical link 46 extends between the two pairs of links 40 and 42 and is pivotally connected thereto at its respective ends by the hinge pins 41 and 43. Similarly two other pairs of similar links 50 and 52, innerconnected by hinge pins 51 and 53, are connected at their respective opposing ends by bolts 54 to the side member 16 and stanchion 30 intermediate their ends, in vertical spaced relation between the top and bottom members 18 and 20.

Similarly a vertical link 56 extends between the pairs of links 50 and 52 and is pivotally connected therewith at each of its respective ends by the hinge pins 51 and 53.

An upstanding vertical support 58 is centrally positioned between the top members 18 and connected therewith by a bolt 60. Each of the stanchions 28 and 30 are recessed adjacent their upper ends, as at 61, to accommodate the support 58. An elongated lever 62 is pivotally connected, intermediate its ends, to the support 58 by a pair of strap iron members 64 secured to opposing sides of the support 58 by bolts 66 for vertical pivoting movement of the lever. A pair of rod members 68 and 70 are pivotally connected at one end to the hinge pins 41 and 51, respectively, and each extend upwardly between the top members 18 on opposing sides of the support 58 where they are each connected by hook-shaped ends 72 and 74, respectively, formed in their upper end portions to suitable eye-bolts 76 and 78, respectively, installed on the lever 62 outwardly of its pivoting support. One end portion of the lever 62 is reduced in size to form a handle portion 80 which projects laterally of the frame 12 a selected distance. When the lever 62 is positioned downward, the stanchions 28 and 30 are in closed parallel position adjacent the center of the frame as shown by solid lines (FIG. 1). Manually moving the lever upwardly to the position shown by dotted lines (FIG. 1) lowers the rod member 68 and raises the rod member 70 thus pivoting the pairs of links 40 and 42 downwardly and pivoting the pairs of links 50 and 52 upwardly which moves the respective stanchions 28 and 30 laterally outward toward the respective side members 14 and 16 thus increasing the spacing between the stanchions. This outward movement of the stanchions is facilitated by the rollers 32, supporting the stanchions, by a rolling contact with the upper edge surface of the top members 18 while the lower rollers 34 contact the depending edge surface of the members 20. Conversely downward movement of the lever 62, from its dotted line position in FIG. 1, simultaneously moves the stanchions 28 and 30 to a closed position.

It will be noted that with the lever 62 in gate closed position wherein the lever is in contact with the adjacent end of the side member 16, as shown by solid lines (FIG. 1), the pairs of links 50 and 52 have their hinge pins 51 and 53 disposed slightly below a line extending between the connecting bolts 54 which locks the stanchion 30 in closed position. This locking action is insured by the rod member 70 which, being connected with the lever 62, prevents any further downward movement of the pins 51 and 53. Similarly it may be seen, from an examination of FIG. 1, that the hinge pins 41 and 43 are aligned with the bolts 44 and are held in this position by the rod 68 thus positively locking the stanchion 28 in a closed position. Additional locking means, for positioning the lever 62 in stanchion closed or partially closed position, is provided by a rod member 82, pivotally connected at one end to an eye bolt 84 carried by the lever and removably connected at its depending end within a bracket 86 secured to the side member 16.

When the stanchions 28 and 30 are in closed position, considerable spacing exists between the respective stanchion and side member and this spacing is substantially closed by a pair of plate members 88 and 90, connected, respectively, by one longitudinal side edge to the respective stanchion 28 and 30 along that side edge portion opposite the recesses 36. Thus, when the stanchions 28 and 30 are moved outwardly, when opening the gate, the plate members 88 and 90 project outwardly beyond the respective side members 14 and 16. The purpose of the plate members 88 and 90 is to prevent an animal from sticking its head or feet in that space between the respective stanchion and the adjacent side member.

A nose bar 92 is removably connected horizontally to the forward side of the side members 14 and 16 by upwardly and forwardly inclined brackets 94 and 96, respectively. The nose bar 92 comprises an elongated rod, having a length substantially equal to the transverse width of the frame and having an arcuately curved off-set 98, intermediate its ends, positioned centrally of the transverse width of the frame. One end of the nose bar is removably connected within a collar 100, rigidly connected with a cylindrical housing 101, slidably carried by a rod 102 forming a part of the bracket 94. A pin 104 holds the nose member within the collar 100. The housing 101 contains a spring member 106, surrounding the rod 102, and resiliently bearing against a friction latch 108 for releasably gripping the rod. The opposing end of the nose member 92 is provided with a pivoting spring actuated latch lever 110 which releasably grips the strap-like bracket 96, thus, when not in use, the nose member 92 may be pivoted laterally of the frame side 14 out of the way or removed from the frame by removing the pin 104.

Operation

In operation, the gate 10 is connected to a chute 26, or the like, with the depending ends of the side members 14 and 16 adjacent or contacting the surface of the earth indicated by the line 111. An animal is driven into the chute 26 in the direction of the gate 10. The lever 62 is manually moved to the dotted line position shown by FIG. 1, providing an apparent exit or opening by which the animal may leave the chute. When the animal's head moves to a position between the stanchions 28 and 30, the lever 62 is quickly pivoted downwardly, thus moving the stanchions into contacting relation on opposing sides of the animal's neck. The respective recesses 36, formed in the adjacent edges of the stanchions, co-operatingly receive the neck of the animal; for example, the lowermost recess is for small animals, such as calves or colts, while the central larger recess grips the neck of full grown cows. An extra large animal would have its neck positioned within the uppermost recess 36. If it is desired to dehorn or examine any portion of the head of an animal, the nose bar 92 is swung into position toward the bracket 96 where the latch 110, locks the nose bar in place. The ends of the nose bar may be manually moved or slid downwardly along the inclined brackets 94 and 96 to properly position the recessed portion 98 of the nose bar across the nose portion of the animal. Upward movement of the nose bar supporting housing 101 can be accomplished only by pivoting the free end of the lever 108 downwardly to disengage its grip on the rod 102. The lever 62 is designed to be manually operated, but it seems obvious that hydraulic or electric means, not shown, may be easily connected with the handle portion 80 for remote control of the device. Similarly when using the gate 10 for wild animals, a trip can be connected with the handle for actuating the gate by the movement of the animal when approaching the gate. In a similar manner a rope, or the like, may be connected with the handle and slidably connected with the lower end of the side member 16 so that an attendant may trip the gate from a remote position simply by pulling on the rope.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A livestock chute gate, comprising: a frame, said frame including a pair of vertical side members joined at their upper ends in fixed spaced-apart relation by a pair of horizontal top members connected to the opposing sides of said side members and a pair of horizontal bottom members connected to the opposing sides of said side members adjacent the lower ends of the latter; a pair of upright co-acting stanchions freely received between said top and said bottom pairs of members for movement toward and away from each other, said stanchions extending above and below said top and said bottom pairs of members, respectively, the adjacent edge portions of said stanchions having a series of arcuate opposing graduated recesses adapted for engaging opposing sides of different aged animal's necks; rollers journaled by the respective upper and lower ends of said stanchions above and below said top and said bottom pairs of members, respectively; upper and lower co-acting pairs of pivotally connected links extending between and pivotally connected to one side of each said side member and the respective adjacent said stanchion; a vertical bar interconnecting the respective said upper and lower pairs of links; a lever pivotally supported intermediate its ends by the medial portion of said pair of top members for vertical pivoting movement, one end portion of said lever being adapted to contact an adjacent upper and lateral surface of said frame to form a stanchion closed position overcenter locking stop for at least one pair of said links; and a pair of rod members extending between and pivotally connected at their opposing ends, respectively, with the respective central pivotal connection of said upper pairs of links and said lever and simultaneously pivoting the respective said upper and lower pairs of links in opposing directions from a stanchion open position to a stanchion closed and locked position when said lever is pivoted downwardly.

2. A gate for connection with either end of a livestock chute, comprising: a frame, said frame including a pair of vertical side members connected in fixed spaced-apart relation at their upper ends by a pair of horizontal top members connected in horizontal spaced-apart relation to opposing sides of said side members and a pair of horizontal bottom members connected in horizontal spaced-apart relation to opposing sides of said side members adjacent the lower ends of the latter, said frame having a forward side and a rearward side; a pair of upright stanchions freely received between said top and bottom pairs of members for movement toward and away from each other to a closed and an opened position, said stanchions extending above and below said top and bottom pairs of members, respectively, the adjacent edge portions of said stanchions having a series of arcuate opposing graduated recesses adapted for engaging opposing sides of different aged animal's necks; a rectangular plate member connected with the rearward side of each said stanchion and projecting laterally therefrom between said top and bottom pairs of members for substantially closing the spacing between the respective said side member and said stanchions when the latter are in closed position; rollers journaled by the respective upper and lower end portions of said stanchions above and below said top and bottom pairs of members, respectively; upper and lower co-acting pairs of pivotally connected links extending horizontally between and pivotally connected in vertical spaced-apart relation to the forward side of each said side member and the adjacent said stanchion intermediate their ends; a bar extending vertically between and interconnecting the respective central pivotal connection of said upper and lower pairs of links; a lever pivotally supported intermediate its ends by the medial portions of said pair of top members for vertical pivoting movement, one end portion of said lever contacting an upper lateral surface of said frame and forming an overcenter locking stop for at least one pair of said links when said lever is pivoted to stanchion closed position, said lever having a handle portion extending laterally from one side of said frame; and a pair of rod members extending between and pivotally connected at their opposing ends, respectively, with the respective central pivotal connection of said upper pairs of links and said lever and pivoting said upper and lower pairs of links connected with the lever opposite its handle portion between a horizontally aligned stanchion locked position and a downwardly folded stanchion open position and pivoting said upper and lower pairs of links connected with the lever adjacent its handle portion between a horizontal overcenter stanchion locked position and an upwardly folded stanchion open position when said lever handle portion is raised.

3. Structure as specified in claim 1, and an upwardly and forwardly inclined guide member connected to the forward side of each said side member intermediate the ends of the latter; and a nose bar extending horizontally between and releasably engaged by said inclined members, said nose bar having an arcuate curve intermediate its ends adapted for holding the nose of an animal held by said gate.

4. Structure as specified in claim 3, and latch means pivotally connected with said lever adjacent said handle portion and releasably connected with the adjacent said side member for holding said lever in stanchion closed or partially closed position.

References Cited in the file of this patent
UNITED STATES PATENTS

| | | |
|---|---|---|
| 325,473 | Arnold | Sept. 1, 1885 |
| 407,083 | Loffer | July 16, 1889 |
| 1,114,094 | Apple | Oct. 20, 1914 |
| 1,323,072 | Kuhlman | Nov. 25, 1919 |
| 1,388,258 | Hasty | Aug. 23, 1921 |
| 1,487,977 | Ryan | Mar. 25, 1924 |
| 1,897,441 | Robertson | Feb. 14, 1933 |
| 2,148,551 | Haigh | Feb. 28, 1939 |
| 2,650,567 | Whitworth | Sept. 1, 1953 |

FOREIGN PATENTS

| | | |
|---|---|---|
| 214,666 | Australia | Jan. 16, 1958 |